(12) United States Patent
Yanagitake et al.

(10) Patent No.: US 10,591,064 B2
(45) Date of Patent: Mar. 17, 2020

(54) SPIRAL WOUND GASKET

(71) Applicant: NIPPON PILLAR PACKING CO., LTD., Osaka (JP)

(72) Inventors: Yuji Yanagitake, Osaka (JP); Naoyuki Sawamoto, Osaka (JP); Hiroki Tanabe, Osaka (JP); Yuta Sato, Osaka (JP); Kiyoshi Toyazaki, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 0 days.

(21) Appl. No.: 16/023,659

(22) Filed: Jun. 29, 2018

(65) Prior Publication Data
US 2019/0011049 A1   Jan. 10, 2019

(30) Foreign Application Priority Data

Jul. 6, 2017  (JP) .................. 2017-132926

(51) Int. Cl.
*F16J 15/12* (2006.01)
*F16L 23/16* (2006.01)
*F16J 15/08* (2006.01)
*F16J 15/10* (2006.01)
*F16L 23/18* (2006.01)

(52) U.S. Cl.
CPC ......... *F16J 15/125* (2013.01); *F16J 15/0887* (2013.01); *F16J 15/102* (2013.01); *F16J 15/104* (2013.01); *F16L 23/16* (2013.01); *F16L 23/18* (2013.01)

(58) Field of Classification Search
CPC ...... F16J 15/125; F16J 15/0887; F16J 15/102; F16J 15/104; F16L 23/16; F16L 23/18
See application file for complete search history.

(56) References Cited

U.S. PATENT DOCUMENTS

| 5,082,296 A | * | 1/1992 | Aizawa | F16J 15/125 |
| | | | | 277/610 |
| 5,683,091 A | * | 11/1997 | Isoe | F16J 15/125 |
| | | | | 277/610 |
| 5,997,007 A | | 12/1999 | Hanashima et al. | |

(Continued)

FOREIGN PATENT DOCUMENTS

| JP | 6-693 | | 1/1994 |
| JP | 2003013969 A | * | 1/2003 |
| JP | 2017120103 A | * | 7/2017 |

*Primary Examiner* — Gilbert Y Lee
(74) *Attorney, Agent, or Firm* — Renner, Otto, Boisselle & Sklar, LLP

(57) ABSTRACT

Provided is a spiral wound gasket that makes it less likely that gaps that are in communication with each other in a spiral shape will remain between layers of a filler member exposed at a gasket face in a state before the gasket is clamped and that is capable of exhibiting sufficient sealability for flanges provided at pipe joints. The present invention provides a spiral wound gasket in which a laminate of a hoop member made of metal and a filler member is wound around an opening and integrated, and which has gasket faces at respective end portions, wherein, at each of the gasket faces, an end portion of the filler member protrudes past an end portion of the hoop member, and the gasket faces have a surface roughness $R_z$ of 30 μm to 200 μm.

2 Claims, 3 Drawing Sheets

(56) References Cited

U.S. PATENT DOCUMENTS

2003/0193147 A1* 10/2003 Hashiguchi ............ F16J 15/125
 277/633
2009/0115139 A1* 5/2009 Jenkins ................. F16L 23/167
 277/610
2018/0023706 A1* 1/2018 Natori .................... F16J 15/122
 277/633

* cited by examiner (a)          (b)

SPIRAL WOUND GASKET

The present application is related to and claims priority under 35 U.S.C. § 119 to Japanese Application No. 2017-132926, filed 6 Jul. 2017, the entirety of which is hereby incorporated herein by reference.

BACKGROUND OF THE INVENTION

1. Field of the Invention

The present invention relates to a spiral wound gasket, and more particularly relates to a spiral wound gasket with improved sealability at pipe joints.

2. Description of the Related Art

Spiral wound gaskets are known in which a hoop member made of metal and formed into a V- or W-shape in cross section and a filler member made of inorganic paper mainly composed of rock wool, ceramic fiber, or the like are laid one on top of the other and wound together (see Japanese Examined Utility Model Publication No. H6-000693 and Japanese Laid-Open Patent Publication No. H10-141503, for example). Such spiral wound gaskets are used as materials (sealing materials) for achieving sealability (e.g., air-tightness or liquid-tightness) at pipe joints of various types of piping.

Here, generally, a material that is wider than the hoop member is used as the filler member that constitutes a spiral wound gasket, and at each of end faces (gasket faces that are to abut against flanges or the like) of a laminated structure formed by the hoop member and the filler member being wound together, end portions of layers of the filler member protrude from between end portions of layers of the hoop member in the thickness direction of the gasket. Thus, gaps are likely to be formed between the protruding end portions of the filler member.

If such gaps are formed in a spiral wound gasket, it is desired that the filler member that is caused to protrude due to the gasket being clamped fills the gaps, but this is not necessarily easy. That is to say, if the amount of compression of the gasket that is applied during clamping is small, the gaps are left in the gasket face in a state in which the gaps are in communication with each other in a spiral shape. In this case, the gaps constitute a leak path for a fluid to be sealed and thus cause leakage.

Therefore, there is demand for development of a spiral wound gasket that makes it less likely that such a gap that may constitute a leak path will remain in a gasket face and that is capable of exhibiting sufficient sealability for flanges provided at pipe joints.

SUMMARY OF THE INVENTION

The present invention has been made to solve the above-described problems, and it is an object thereof to provide a spiral wound gasket that makes it less likely that gaps that are in communication with each other in a spiral shape will remain between layers of a filler member exposed at a gasket face in a state before the gasket is clamped and that is capable of exhibiting sufficient sealability for flanges provided at pipe joints.

The present invention provide a spiral wound gasket in which a laminate of a hoop member made of metal and a filler member is wound around an opening and integrated, and which has gasket faces at respective end portions, wherein, at each of the gasket faces, an end portion of the filler member protrudes past an end portion of the hoop member, and the gasket faces have a surface roughness $R_z$ of 30 μm to 200 μm.

In one embodiment, the filler member prior to winding has a 25% compressive load P of 5 MPa to 9 MPa, a percentage Tr that expresses a ratio of a thickness of the filler member prior to winding to a thickness of the hoop member prior to winding is 200% to 1500%, and V (%/MPa) that is calculated using the 25% compressive load P and the percentage Tr and that is expressed by an equation (I) below is 22 to 300:

$$V = \frac{Tr}{P}. \qquad (I)$$

According to the present invention, it is possible to provide a spiral wound gasket that makes it less likely that a spiral gap that may constitute a leak path will remain between layers of a filler member exposed at a gasket face and that is capable of exhibiting sufficient sealability for flanges provided at various types of pipe joints.

DESCRIPTION OF THE PREFERRED EMBODIMENTS

Hereinafter, the present invention will be described in detail using the drawings.

Figure 1:
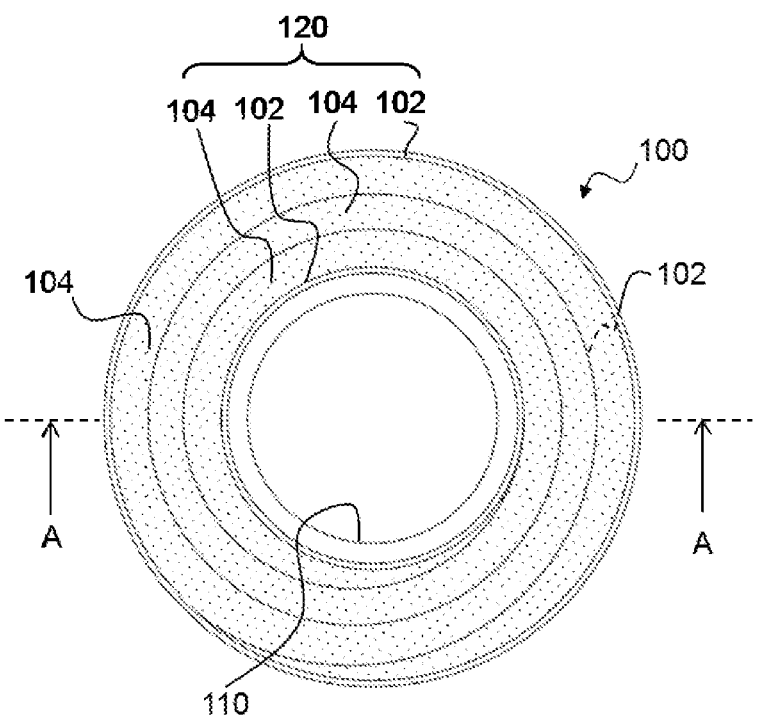
FIG. 1 schematically shows an example of a spiral wound gasket of the present invention; (a) is a plan view of the spiral wound gasket, and (b) is a cross-sectional view of the spiral wound gasket shown in the (a) taken along direction A-A.
Figure 1:
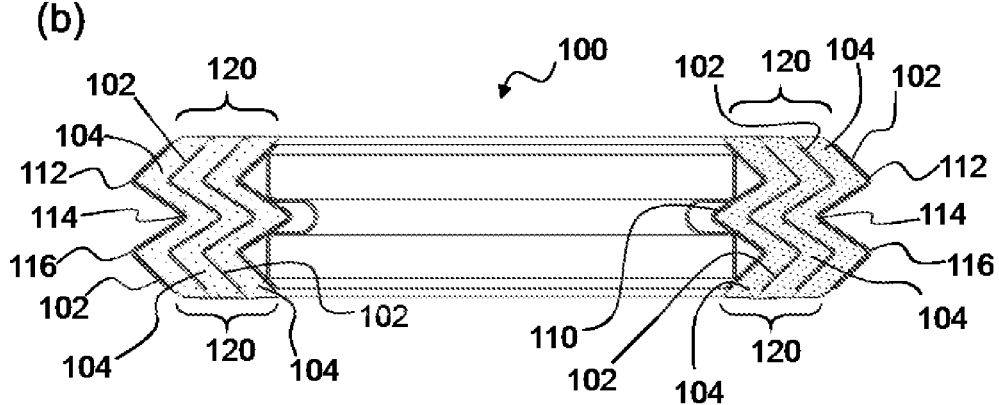

FIG. 1 schematically shows an example of a spiral wound gasket of the present invention.

As shown in (a) of FIG. 1, a spiral wound gasket 100 (hereinafter also referred to simply as "gasket 100") of the present invention is configured by winding and integrating a laminate of a hoop member 102 made of metal and a filler member 104 so as to have an opening 110 at the center. Note that, in the (a) of FIG. 1, the hoop member 102 is shown on the outer periphery and the inner periphery of the gasket 100, but as will be described later, throughout the above-described winding, the hoop member 102 is disposed in a state in which an end portion of the filler member 104 at a gasket face 120 protrudes past an end portion of the hoop member 102, and the hoop member 102 is embedded between layers of the filler member 104 inside the gasket face 120.

The hoop member 102 is preferably a single thin strip of metal such as, for example, stainless steel, iron, nickel, or aluminum. It is preferable that the hoop member 102 is composed of stainless steel because stainless steel is easily available and has sufficient strength and heat resistance. Furthermore, in the present invention, a hoop member having an initial thickness Th of preferably 0.1 mm to 0.3 mm and more preferably 0.1 mm to 0.15 mm is used as the hoop member 102. Here, the term "initial thickness Th of a hoop member" as used herein refers to the thickness of the hoop member in a state before a laminate of the hoop member and a filler member is wound.

The filler member 104 is disposed between layers of the wound hoop member 102 within the gasket 100. The filler member 104 is preferably a single tape-like sheet composed of a material such as, for example, expanded graphite, inorganic paper (containing inorganic fibers such as rock wool or ceramic fiber, for example), and porous tetrafluoroethylene, as well as a combination of these. It is preferable that the filler member 104 is composed of expanded graphite because expanded graphite can impart a high degree of sealability to the gasket 100 despite its relatively low density and also has excellent heat resistance in itself.

Also, the filler member 104 in a state prior to winding has a density of preferably 1.0 g/cm$^3$ to 1.2 g/cm$^3$. When the filler member has a density within this range, a gasket with a large compression amount can be obtained. Furthermore, in the present invention, a filler member having an initial thickness Tf of preferably 0.4 mm to 1.5 mm and more preferably 0.4 mm to 0.8 mm is used as the filler member 104. Here, the term "initial thickness Tf of a filler member" as used herein refers to the thickness of the filler member in a state before a laminate of the filler member and a hoop member is wound.

According to the present invention, the opening 110 is provided substantially at the center of the spiral wound gasket 100, and a liquid flow or a gas flow from a pipe joint can pass through the opening 110. The opening 110 preferably has a substantially circular shape or a substantially elliptical shape. The diameter of the opening 110 is set as appropriate in accordance with the inner diameter of pipes to which the gasket 100 is to be attached. In the embodiment shown in the (a) of FIG. 1, the gasket 100 is formed by the hoop member 102 and the filler member 104 being laid one on top of the other (i.e., laminated) in the radial direction and wound together any desired number of turns around this opening 110 while a predetermined load (winding load) is applied thereto, and consequently, a gasket face 120 constituted by end portions of a plurality of layers of the filler member 104 is formed. That is to say, the gasket face 120 is constituted by the end portions of the filler member 104 that protrude from end portions of the hoop member 102.

The width of the gasket face 120 in the radial direction is, for example, 4 mm to 10 mm and preferably 5 mm to 8 mm, although this width is not necessarily limited.

FIG. 1(b) is a cross-sectional view of the gasket 100 shown in the (a) of FIG. 1 above taken along direction A-A (corresponding to the thickness direction of the hoop member 102 and the filler member 104 and the radial direction of the gasket 100).

According to the embodiment shown in the (b) of FIG. 1, in the gasket 100, a portion in which the hoop member 102 and the filler member 104 are laminated (in the (b) of FIG. 1, three layers of each of the members are laminated in the radial direction) is provided on the outer peripheral side of the opening 110. In the (b) of FIG. 1, the hoop member 102 has three bent portions (bends) (i.e., a first bent portion 112, a second bent portion 114, and a third bent portion 116 in this order from the upper side to the lower side in the (b) of FIG. 1) in the thickness direction of the gasket 100, and has a W-shape in cross section as a whole.

In the gasket 100, the end portions of the filler member 104 protrude past the end portions of the hoop member 102 at each gasket face 120. That is to say, each gasket face 120 is constituted by the end portions of the filler member 104 that protrude from the end portions of the hoop member 102. The feature provided by the end portions of the filler member 104 protruding in this manner preferably appears at the gasket faces 120, which are opposite end faces (i.e., upper and lower faces in FIG. 1(b)), of the gasket 100.

Furthermore, in the gasket 100, the gasket faces 120 have a surface roughness $R_z$ (maximum height roughness) of 30 µm to 200 µm and preferably 30 µm to 100 µm. Here, the maximum height roughness "$R_z$" refers to the surface roughness that is calculated in conformity with JIS B 0601:2013, and can be obtained as the sum of the maximum profile peak height ($Z_p$) and the maximum profile valley depth ($Z_v$) within a sampling length of the gasket faces 120. If a gasket face has a surface roughness of less than 30 µm, projections and depressions of the gasket face are smaller; however, in order to achieve such a surface roughness, it is necessary to subject the gasket face to special surface treatment such as polishing, and, for example, there is concern that the manufacturing process will be complicated. If a gasket face has a surface roughness of more than 200 µm, the gasket is in a state in which noticeable gaps are formed between adjacent layers of the filler member in a cross section of the gasket (e.g., a cross section of the gasket taken in the thickness direction as shown in the (b) of FIG. 1). Thus, there is concern that the gaps will communicate with each other in a spiral shape in the gasket face and constitute a leak path for the fluid to be sealed.

Figure 2:
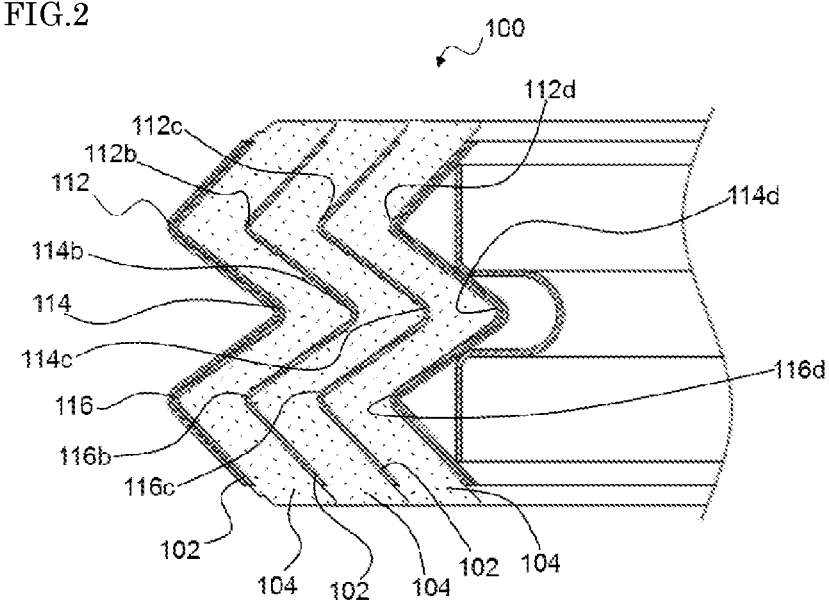
FIG. 2 is a partially-enlarged cross-sectional view of the gasket of the present invention shown in the (b) of FIG. 1.

FIG. 2 is a partially-enlarged cross-sectional view of the gasket 100 shown in the (b) of FIG. 1.

In the hoop member 102 that is shown in FIG. 2 and is wound a plurality of turns, first bent portions 112, 112b, 112c, and 112d are preferably provided at substantially the same height in the thickness direction of the gasket 100. Moreover, the shortest distances between adjacent layers of the hoop member 102 (i.e., the shortest distance from the first bent portion 112 to the first bent portion 112b, the shortest distance from the first bent portion 112b to the first bent portion 112c, and the shortest distance from the first bent portion 112c to the first bent portion 112d) are preferably substantially the same.

Similarly, in the hoop member 102 that is shown in FIG. 2 and is wound the plurality of turns, second bent portions 114, 114b, 114c, and 114d are preferably provided at substantially the same height in the thickness direction of the spiral wound gasket. Moreover, the shortest distance from the second bent portion 114 to the second bent portion 114b, the shortest distance from the second bent portion 114b to the second bent portion 114c, and the shortest distance from the second bent portion 114c to the second bent portion 114d are preferably substantially the same. Furthermore, in the hoop member 102 that is shown in FIG. 2 and is wound the plurality of turns, third bent portions 116, 116b, 116c, and 116d are preferably provided at substantially the same height in the thickness direction of the spiral wound gasket. Moreover, the shortest distance from the third bent portion 116 to the third bent portion 116b, the shortest distance from the third bent portion 116b to the third bent portion 116c, and the shortest distance from the third bent portion 116c to the third bent portion 116d are preferably substantially the same.

Here, in order for the gasket 100 to have a configuration in which the filler member 104 prior to clamping (i.e., in an uncompressed state before the gasket 100 is attached to pipe joints) protrudes in the thickness direction of the gasket 100, and almost no noticeable gap is formed, it is considered important that (1) the material constituting the filler member 104 has high compressibility (i.e., softness) in terms of the compression characteristics, and/or (2) the initial thickness Tf of the filler member 104 is large relative to the initial thickness Th of the hoop member 102.

Figure 3:
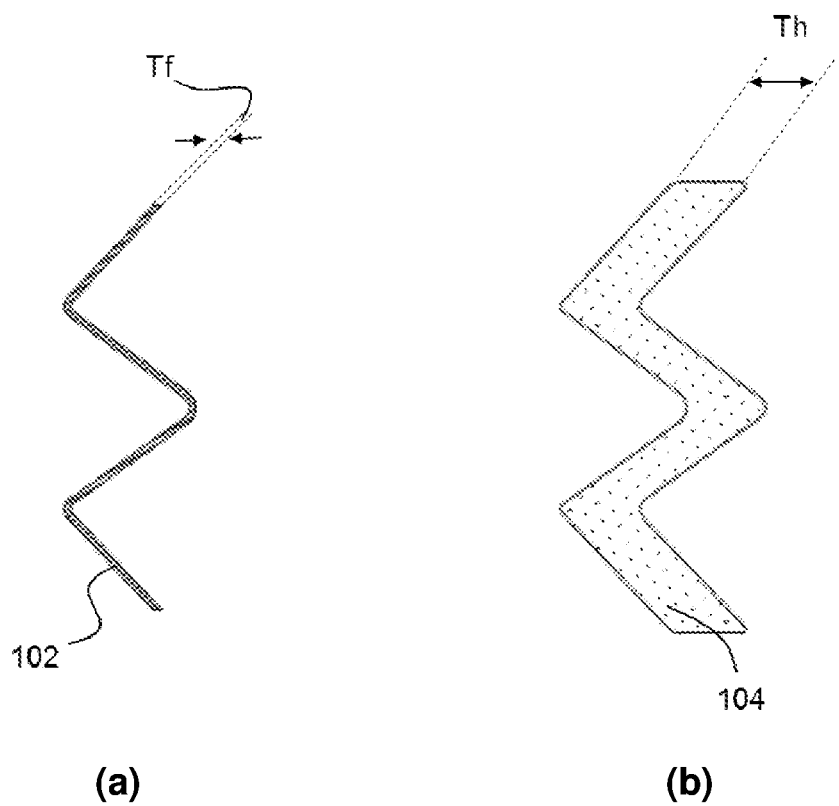
FIGS. 3(a) and 3(b) show schematic cross-sectional views for explaining initial thicknesses of a hoop member (FIG. 3(a)) and a filler member (FIG. 3(b)) prior to winding, the hoop member and the filler member constituting the gasket of the present invention shown in the (b) of FIG. 1.

From these points of view, first, "(1) the compression characteristics of the material constituting the filler member 104" will be examined using FIGS. 3(a) and 3(b). FIGS. 3(a) and 3(b) show schematic cross-sectional views for explaining the initial thicknesses of the hoop member 102 (FIG. 3(a)) and the filler member 104 (FIG. 3(b)) prior to winding, the hoop member 102 and the filler member 104 constituting the gasket 100 shown in the (b) of FIG. 1.

In the present invention, "(1) the compression characteristics of the material constituting the filler member 104" can be expressed using, for example, a 25% compressive load P of the filler member 104 (25% compressive load of the filler member 104 in the thickness direction of the filler member 104 (radial direction of the gasket 100 when wound)). It can be evaluated that the smaller the value of the 25% compressive load P, the easier it is to compress the filler member 104 (i.e., the softer the filler member 104), and it can also be evaluated that the greater the value of P, the more difficult it is to compress the filler member 104 (i.e., the harder the filler member 104). Note that the 25% compressive load can be measured in conformity with JIS 6254 as the value (MPa) of the load that is necessary to compress a test piece and reduce the thickness of the test piece to 25% of its original thickness (thickness prior to compression).

Here, in the gasket 100, the 25% compressive load of the filler member 104 is preferably 5 MPa to 9 MPa and more preferably 6 MPa to 8 MPa. When the 25% compressive load of the filler member 104 is within the above-described range, it is less likely that a noticeable gap will remain or occur between layers of the filler member 104 protruding at each gasket face 120, and thus, the gasket faces 120 are even more flattened. That is to say, if the 25% compressive load of the filler member 104 is less than 5 MPa, the amount of compression of the layers of the filler member 104 sandwiched between the layers of the hoop member 102 during winding is excessively large, and there is a risk that the layers of the filler member 104 protruding at each gasket face 120 will push against each other and thereby be caused to rise, and thus the flatness of the gasket faces 120 will decrease (the surface roughness of the gasket faces 120 will exceed 200 µm). Moreover, if the 25% compressive load of the filler member 104 is more than 9 MPa, the amount of compression of the layers of the filler member 104 sandwiched between the layers of the hoop member 102 during winding is excessively small, and there is a risk that gaps between the layers of the filler member 104 protruding at each gasket face 120 cannot be filled, and the flatness of the gasket faces 120 will decrease (the surface roughness of the gasket faces 120 will exceed 200 µm).

Next, "(2) the initial thickness Tf of the filler member 104 relative to the initial thickness Th of the hoop member 102" will be examined.

In the present invention, "(2) the initial thickness Tf of the filler member 104 relative to the initial thickness Th of the hoop member 102" can be expressed, for example, as a percentage Tr of the initial thickness Tf of the filler member 104 relative to the initial thickness Th of the hoop member 102:

$$Tr = \frac{Tf}{Th} \times 100\,(\%).$$

That is to say, it can be evaluated that the greater the value of the percentage Tr, the larger the compression amount of the filler member 104 during winding, while the smaller the value of Tr, the smaller the compression amount of the filler member 104 during winding.

Here, in the gasket 100, the percentage Tr, which is the ratio of the initial thickness Tf of the filler member 104 to the initial thickness Th of the hoop member 102, is preferably 200% to 1500% and more preferably 400% to 800%. When the percentage Tr is within the above-described range, it is less likely that a noticeable gap will remain or occur between the layers of the filler member 104 protruding at each gasket face 120, and thus the gasket faces 120 are even more flattened. That is to say, if the percentage Tr is less than 200%, the amount of compression of the layers of the filler member 104 sandwiched between the layers of the hoop member 102 during winding is excessively small, and there is a risk that gaps between the layers of the filler member 104 protruding at each gasket face 120 cannot be filled, and the flatness of the gasket faces 120 will decrease (the surface roughness of the gasket faces 120 will exceed 200 µm). Moreover, if the percentage Tr is more than 1500%, the amount of compression of the layers of the filler member 104 sandwiched between the layer of the hoop member 102 during winding is excessively large, and there is a risk that the layers of the filler member 104 protruding at each gasket face 120 will push against each other and thereby be caused to rise, and the flatness of the gasket faces 120 will decrease (the surface roughness of the gasket faces 120 will exceed 200 µm).

Note that, in the present invention, in the case where the 25% compressive load P of the filler member 104 is within the range of 5 MPa to 9 MPa, and the percentage Tr, which is the ratio of the initial thickness Tf of the filler member 104 to the initial thickness Th of the hoop member 102, is within the range of 200% to 1500%, when V (%/MPa) that is calculated using the 25% compressive load P and the percentage Tr and that is expressed by an equation (I) below is preferably 22 to 300 and more preferably 24 to 260:

$$V = \frac{Tr}{P}, \tag{I}$$

the gasket 100 provides even more flattened gasket faces 120 and can exhibit a higher degree of sealability for flanges provided at pipe joints.

The gasket 100 as a whole has a density of preferably 2.1 g/cm³ to 2.4 g/cm³. When the density of the gasket as a whole satisfies this range, a gasket 100 with a large compression amount can be produced if stainless steel is used for the hoop member 102 and expanded graphite is used for the filler member 104.

Figure 4:
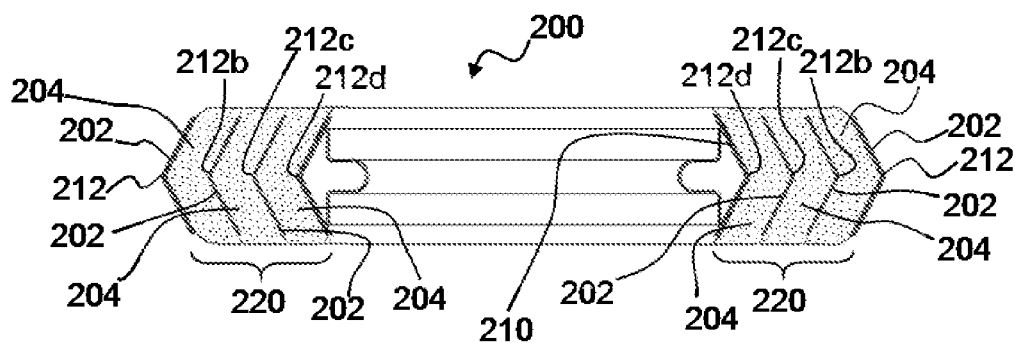
FIG. 4 is a cross-sectional view schematically showing another example of the spiral wound gasket of the present invention.

FIG. 4 is a cross-sectional view schematically showing another example of the spiral wound gasket of the present invention.

According to an embodiment shown in FIG. 4, in a spiral wound gasket 200 (hereinafter also referred to simply as "gasket 200") of the present invention, a portion in which a hoop member 202 and a filler member 204 are laminated (in FIG. 4, three layers of each of the hoop member 202 and the filler member 204 are laminated in the radial direction) is provided on the outer peripheral side of an opening 210. In FIG. 4, the hoop member 202 has a single bent portion (bend) 212 in the thickness direction of the gasket 200, and has a V-shape in cross section as a whole.

In the gasket 200 as well, as in the case of the gasket 100, the end portions of the filler member 204 protrude past the end portions of the hoop member 202 at each gasket face 220, and each gasket face 220 is constituted by the end portions of the filler member 204 that protrude from the end portions of the hoop member 202. Moreover, the gasket 200 has a predetermined surface roughness $R_z$ on each gasket face 220.

Figure 5:
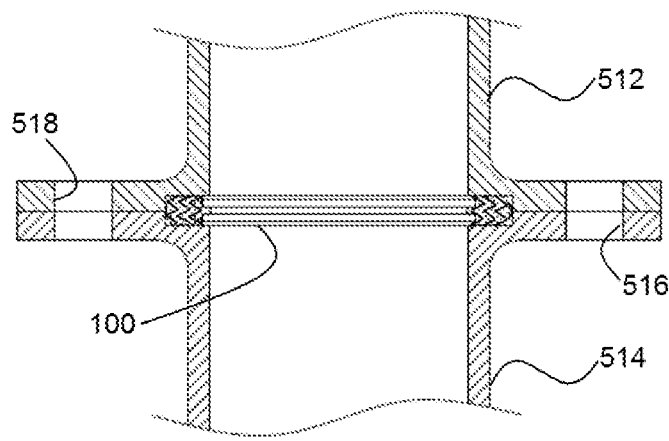
FIG. 5 is a cross-sectional view for schematically illustrating a state in which the spiral wound gasket of the present invention shown in the (b) of FIG. 1 is disposed at pipe joints.

FIG. 5 is a cross-sectional view for schematically illustrating a state in which the gasket 100 shown in the (b) of FIG. 1 is disposed at pipe joints.

The gasket 100 is disposed between flanges of two pipe joints 512 and 514, for example. Then, bolts are inserted into holes 516 and 518 that are provided in the flanges of the pipe joints 512 and 514, and the flanges are clamped together with nuts and fixed. Thus, the gasket 100 can exhibit conformability with respect to the flanges of the pipe joints 512 and 514 and provide a high degree of sealability to the connection between the pipe joints 512 and 514.

Figure 6:
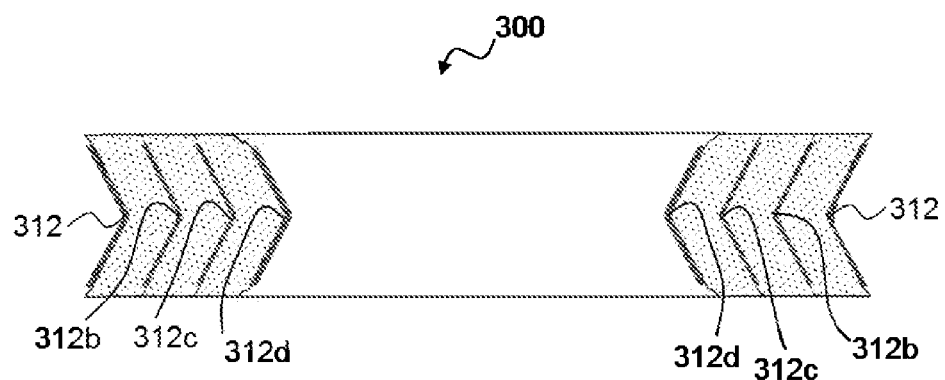
FIG. 6 is a cross-sectional view schematically showing yet another example of the spiral wound gasket of the present invention.

Note that, in the description of the foregoing embodiments, FIGS. 1 to 5 show that the bent portions 112 to 112d and 116 to 116d as well as 212 to 212d of the V- or W-shaped cross section of the hoop member 102 or 202 have bent shapes that are displaced outward in the radial direction; however, the spiral wound gasket of the present invention may also have, for example, the form of a gasket 300 in which bent portions 312, 312b, 312c and 312d are displaced inward in the radial direction as shown in FIG. 6.

EXAMPLES

Hereinafter, the present invention will be more specifically described by means of examples. It is to be understood that the present invention is not limited to the examples below.

Example 1

Production and Evaluation of Test Gaskets Using Hoop Member Having W-Shape in Cross Section A hoop member having a W-shape in cross section was produced by drawing SUS304 band steel with a width of 7.1 mm and an initial thickness (Th) of 0.13 mm. Note that, in the thus produced hoop member having the W-shape in cross section, all of the angles constituting the bent portions were the same. On the other hand, various pieces of expanded graphite tape with a width of 7.5 mm and an initial thickness (Tf) of 0.18 mm to 2.08 mm were prepared, and among these, those pieces whose 25% compressive load P in conformity with JIS 6254 was within the range of 5 MPa to 9 MPa were selected. Then, each of the selected pieces of expanded graphite tape was used as a filler member, and laminated on one surface of the hoop member having the W-shape in cross section, and the laminate was spirally wound three turns while a load of 15 kgf was applied thereto using a pressure roll, to produce a test gasket. In this manner, a plurality of test gaskets were produced for each of the filler members (filler members with different initial thicknesses Tf and 25% compressive loads P). Note that at each gasket face of the obtained test gaskets, the protruding amount of the filler member was 0.1 mm to 0.4 mm. Furthermore, the obtained test gaskets had an opening with a diameter of 49 mm at their center, and the outer periphery and the inner periphery of each test gasket were reinforced using SUS304 band steel similar to that of the hoop member.

Each of the obtained test gaskets was cut along a line passing through the center of the opening along the thickness direction of the gasket, and whether or not a gap formed by the filler member protruding at each gasket face was present in the gasket face was visually observed over the cutting plane. With respect to each of the test gaskets, if the presence of a gap was not visually observed, the test gasket was evaluated as "good", and if a gap was observed, the test gasket was evaluated as "poor". The obtained results are shown in sections denoted by "G (Gap)" in Table 1.

Moreover, the surface roughness (maximum height roughness) $R_z$ of the gasket faces of each of the obtained test gaskets was measured in conformity with JIS B 06012013 using a surface roughness measuring machine (SJ-210 manufactured by Mitutoyo Corporation). With respect to each of the test gaskets, if the surface roughness $R_z$ of the test gasket was within the range of 30 μm to 200 μm, the test gasket was evaluated as "good", and if the surface roughness $R_z$ of the test gasket was outside the above-described range, the test gasket was evaluated as "poor". The obtained results are shown as the flatness of the gasket faces in sections denoted by "F (Flatness)" in Table 1.

TABLE 1

| Percentage(%) of ratio (Tr)[1] | 25% Compressive loads: P (MPa) | | | | | | |
|---|---|---|---|---|---|---|---|
| | 4 | 5 | 6 | 7 | 8 | 9 | 10 |
| 140 | G: Good | G: Good | G: Good | G: Poor | G: Poor | G: Poor | G: Poor |
| | F: Good | F: Good | F: Good | F: Poor | F: Poor | F: Poor | F: Poor |
| | (i) | (i) | (i) | (iii) | (iii) | (iii) | (iii) |
| Tr/P value | 35 | 28 | 23 | 20 | 18 | 16 | 14 |
| 160 | G: Good | G: Good | G: Good | G: Good | G: Poor | G: Poor | G: Poor |
| | F: Good | F: Good | F: Good | F: Good | F: Poor | F: Poor | F: Poor |
| | (i) | (i) | (i) | (i) | (iii) | (iii) | (iii) |
| Tr/P value | 40 | 32 | 27 | 23 | 20 | 18 | 16 |
| 180 | G: Good | G: Good | G: Good | G: Good | G: Good | G: Poor | G: Poor |
| | F: Good | F: Good | F: Good | F: Good | F: Good | F: Poor | F: Poor |
| | (i) | (i) | (i) | (i) | (i) | (iii) | (iii) |

TABLE 1-continued

| Percentage(%) of ratio (Tr)[1] | 25% Compressive loads: P (MPa) | | | | | | |
|---|---|---|---|---|---|---|---|
| | 4 | 5 | 6 | 7 | 8 | 9 | 10 |
| Tr/P value 200 | 45<br>G: Good<br>F: Good<br>(i) | 36<br>G: Good<br>F: Good<br>(i) | 30<br>G: Good<br>F: Good<br>(i) | 26<br>G: Good<br>F: Good<br>(i) | 23<br>G: Good<br>F: Good<br>(i) | 20<br>G: Good<br>F: Good<br>(i) | 18<br>G: Poor<br>F: Poor<br>(iii) |
| Tr/P value 400 | 50<br>G: Good<br>F: Good<br>(i) | 40<br>G: Good<br>F: Good<br>(i) | 33<br>G: Good<br>F: Good<br>(i) | 29<br>G: Good<br>F: Good<br>(i) | 25<br>G: Good<br>F: Good<br>(i) | 22<br>G: Good<br>F: Good<br>(i) | 20<br>G: Good<br>F: Good<br>(i) |
| Tr/P value 600 | 100<br>G: Good<br>F: Good<br>(i) | 80<br>G: Good<br>F: Good<br>(i) | 67<br>G: Good<br>F: Good<br>(i) | 57<br>G: Good<br>F: Good<br>(i) | 50<br>G: Good<br>F: Good<br>(i) | 44<br>G: Good<br>F: Good<br>(i) | 40<br>G: Good<br>F: Good<br>(i) |
| Tr/P value 800 | 150<br>G: Good<br>F: Good<br>(i) | 120<br>G: Good<br>F: Good<br>(i) | 100<br>G: Good<br>F: Good<br>(i) | 86<br>G: Good<br>F: Good<br>(i) | 75<br>G: Good<br>F: Good<br>(i) | 67<br>G: Good<br>F: Good<br>(i) | 60<br>G: Good<br>F: Good<br>(i) |
| Tr/P value 1000 | 200<br>G: Good<br>F: Good<br>(i) | 160<br>G: Good<br>F: Good<br>(i) | 133<br>G: Good<br>F: Good<br>(i) | 114<br>G: Good<br>F: Good<br>(i) | 100<br>G: Good<br>F: Good<br>(i) | 89<br>G: Good<br>F: Good<br>(i) | 80<br>G: Good<br>F: Good<br>(i) |
| Tr/P value 1200 | 250<br>G: Good<br>F: Good<br>(i) | 200<br>G: Good<br>F: Good<br>(i) | 167<br>G: Good<br>F: Good<br>(i) | 143<br>G: Good<br>F: Good<br>(i) | 125<br>G: Good<br>F: Good<br>(i) | 111<br>G: Good<br>F: Good<br>(i) | 100<br>G: Good<br>F: Good<br>(i) |
| Tr/P value 1400 | 300<br>G: Good<br>F: Poor<br>(ii) | 240<br>G: Good<br>F: Good<br>(i) | 200<br>G: Good<br>F: Good<br>(i) | 171<br>G: Good<br>F: Good<br>(i) | 150<br>G: Good<br>F: Good<br>(i) | 133<br>G: Good<br>F: Good<br>(i) | 120<br>G: Good<br>F: Good<br>(i) |
| Tr/P value 1500 | 350<br>G: Good<br>F: Poor<br>(ii) | 280<br>G: Good<br>F: Good<br>(i) | 233<br>G: Good<br>F: Good<br>(i) | 200<br>G: Good<br>F: Good<br>(i) | 175<br>G: Good<br>F: Good<br>(i) | 156<br>G: Good<br>F: Good<br>(i) | 140<br>G: Good<br>F: Good<br>(i) |
| Tr/P value 1600 | 375<br>G: Good<br>F: Poor<br>(ii) | 300<br>G: Good<br>F: Poor<br>(ii) | 250<br>G: Good<br>F: Good<br>(i) | 214<br>G: Good<br>F: Good<br>(i) | 188<br>G: Good<br>F: Good<br>(i) | 167<br>G: Good<br>F: Good<br>(i) | 150<br>G: Good<br>F: Good<br>(i) |
| Tr/P value | 400 | 320 | 267 | 229 | 200 | 178 | 160 |

[1]"Tr percentage (%) that expresses ratio of initial thickness of a filler member to initial thickness of a hoop member", i.e., a value calculated with Tr = Tf/Th × 100(%)
G: Gap
F: Flatness As shown in Table 1, it is considered that test gaskets whose gasket faces had a surface roughness (maximum height roughness) $R_z$ within the range of 30 μm to 200 μm (gaskets whose flatness "F" was evaluated as good and that fall into a category "(i)" in Table 1) had sufficiently flat gasket faces for exhibiting sealing performance, and based on the results of a performance test, which will be described later, it was judged that those gaskets were favorable as gaskets.

In contrast, in test gaskets that fall into a category "(ii)" in Table 1, although no gap was formed between the layers of the filler member protruding from the end portions of the hoop member at their gasket faces, the surface roughness (maximum height roughness) $R_z$ of their gasket faces was more than 200 μm (the flatness "F" was evaluated as poor), and based on the results of the performance test, which will be described later, it was judged that those test gaskets were unsuitable as gaskets.

Furthermore, in test gaskets that fall into a category "(iii)" in Table 1, a gap was formed between the layers of the filler member protruding from the end portions of the hoop member at their gasket faces, and thus, the surface roughness (maximum height roughness) $R_z$ of their gasket faces was inevitably more than 200 μm (the flatness "F (Flatness)" was evaluated as poor), and based on the results of the performance test, which will be described later, it was judged that those test gaskets were unsuitable as gaskets.

Subsequently, each of the test gaskets under the category (i) obtained above was held between FF flanges of pipe joints with a compression amount of 0.1 mm or 0.2 mm, and the flanges were fixed together with a predetermined clamping pressure. Then, compressed air serving as a fluid was passed through the pipe joints with an internal pressure of 49 kPa, and the amount (amount of leakage) of fluid leaking from a portion where the gasket was held between the flanges was measured using a mass flowmeter. All of the test gaskets under the category (i) showed an amount of leakage of not more than 10 cc/min when the fluid was passed therethrough, and it was confirmed that those test gaskets had excellent sealing performance as gaskets. Table 2 shows the obtained results.

Furthermore, with respect to the test gaskets classified into the category (ii) or (iii) in Table 1, the amount of leakage of fluid between FF flanges was measured in the same manner as described above. All of the test gaskets under the categories (ii) and (iii) had an amount of leakage of more than 10 cc/min, and it was confirmed that the sealing performance of those test gaskets was inferior to that of the test gaskets under the category (i) above. Table 2 shows the obtained results.

TABLE 2

| Categories in Table 1 | Examples (i) | Comparative Examples (ii) | Comparative Examples (iii) |
|---|---|---|---|
| Hoop member | SUS304 band steel (width: 7.1 mm, initial thickness: 0.13 mm) having W-shape in cross section | Same as the left | Same as the left |
| Filler member | Expanded graphite tape (width: 7.5 mm, initial thickness: 0.18 to 2.08 mm, 25% compressive load: 5 to 9 MPa) | Same as the left | Same as the left |
| Winding load (kgf) | 15 | Same as the left | Same as the left |
| Protruding amount (mm) of filler | 0.1 to 0.3 | 0.1 to 0.4 | 0.1 to 0.3 |
| Value of Tr/P Tr: percentage (%) that expresses ratio between thicknesses P: 25% compressive load (MPa) | 22 to 300 | More than 300 | Less than 22 |
| Whether gap was observed between layers of filler member | Not observed | Not observed | Observed |
| Flatness of gasket face (Surface roughness $R_z$ of gasket face) | Within 30 to 200 μm | More than 200 μm | More than 200 μm |
| Amount of leakage of fluid (Sealing performance) — Compression amount: 0.1 mm | Average 9 cc/min (Not more than 10 cc/min with respect to all the test gaskets) | Average 25 cc/min (More than 10 cc/min with respect to all the test gaskets) | Average 37 cc/min (More than 10 cc/min with respect to all the test gaskets) |
| Amount of leakage of fluid (Sealing performance) — Compression amount: 0.2 mm | Average 8 cc/min (Not more than 10 cc/min with respect to all the test gaskets) | Average 20 cc/min (More than 10 cc/min with respect to all the test gaskets) | Average 32 cc/min (More than 10 cc/min with respect to all the test gaskets) |

As shown in Table 2, among the test gaskets that were produced as described above, the gaskets under the category (i) had no gap between the layers of the filler member protruding from the end portions of the hoop member at their gasket faces, and it is considered that those gaskets had sufficiently flat gasket faces for exhibiting sealing performance. Thus, it can be seen that those gaskets had excellent sealing performance.

Example 2

Production and Evaluation of Test Gaskets Using Hoop Member Having V-shape in Cross Section Filler members having various 25% compressive loads P and percentages Tr with respect to the thicknesses were produced, and a hoop member having a V-shape in cross section was produced by drawing SUS304 band steel similar to that of Example 1. That is to say, test gaskets were produced in the same manner as in Example 1 except that the hoop member having a different shape in cross section than that of Example 1 was used.

With respect to the obtained test gaskets, the flatness was evaluated based on the surface roughness $R_z$ of their gasket faces, and whether or not a gap was present was visually observed, in the same manner as in Example 1. As a result, it was confirmed that test gaskets whose surface roughness $R_z$ was within the range of 30 μm to 200 μm were favorable as gaskets.

Moreover, with respect to the test gaskets whose gasket faces had a surface roughness $R_z$ within the range of 30 μm to 200 μm, the amount of leakage of fluid between FF flanges was measured in the same manner as in Example 1. It was confirmed that all of the test gaskets having a surface roughness $R_z$ within the above-described range had an amount of leakage of less than 10 cc/min and had excellent sealing performance.

Example 3

Production and Evaluation of Test Gaskets with Filler Members Being Changed

Except that various pieces of non-asbestos paper made of nonmetal with a width of 7.5 mm and an initial thickness (Tf) of 0.18 mm to 2.08 mm were used as filler members instead of the pieces of expanded graphite tape, test gaskets were produced in the same manner as in Example 1. That is to say, filler members having various 25% compressive loads P and percentages Tr with respect to the thicknesses were produced, and a hoop member having a W-shape in cross section was produced.

With respect to the obtained test gaskets, the flatness was evaluated based on the surface roughness $R_z$ of their gasket faces, and whether or not a gap was present was visually observed, in the same manner as in Example 1. As a result, it was confirmed that test gaskets whose surface roughness $R_z$ was within the range of 30 μm to 200 μm were favorable as gaskets.

Moreover, with respect to the test gaskets whose gasket faces had a surface roughness $R_z$ within the range of 30 μm to 200 μm, the amount of leakage of fluid between FF flanges was measured in the same manner as in Example 1. It was confirmed that all of the test gaskets having a surface roughness $R_z$ within the above-described range had an amount of leakage of less than 10 cc/min and had excellent sealing performance.

What is claimed is:

1. A spiral wound gasket in which a laminate of a hoop member made of metal and a filler member is wound around an opening and integrated, and which has gasket faces at respective end portions,
    wherein, at each of the gasket faces, an end portion of the filler member protrudes past an end portion of the hoop member,
    the gasket faces have a surface roughness $R_z$ of 30 μm to 200 μm, and
    the surface roughness $R_z$ is a surface roughness on the gasket face constituted by end portions of a plurality of layers of the filler member.

2. The gasket of claim 1, wherein the filler member prior to winding has a 25% compressive load P of 5 MPa to 9 MPa,
    a percentage Tr that expresses a ratio of a thickness of the filler member prior to winding to a thickness of the hoop member prior to winding is 200% to 1500%, and
    V (%/MPa) that is calculated using the 25% compressive load P and the percentage Tr and that is expressed by an equation (I) below is 22 to 300:

$$V = \frac{Tr}{P}. \tag{I}$$

* * * * *